United States Patent [19]

Kataoka

[11] Patent Number: 5,631,516

[45] Date of Patent: May 20, 1997

[54] VIBRATION TYPE ACTUATOR DEVICE

[75] Inventor: Kenichi Kataoka, Yokohama, Japan

[73] Assignee: Canon Kabushiki Kaisha, Tokyo, Japan

[21] Appl. No.: 397,734

[22] Filed: Mar. 2, 1995

Related U.S. Application Data

[63] Continuation of Ser. No. 68,075, May 28, 1993, abandoned.

[30] Foreign Application Priority Data

Jun. 2, 1992 [JP] Japan .................................. 4-141455

[51] Int. Cl.$^6$ .................................................. H02N 2/00
[52] U.S. Cl. ........................................................ 310/316
[58] Field of Search .................................. 310/316, 317; 318/116

[56] References Cited

U.S. PATENT DOCUMENTS

| | | | |
|---|---|---|---|
| 3,573,781 | 4/1971 | Shoh | 310/317 |
| 4,510,411 | 4/1985 | Hakamata et al. | 310/316 |
| 4,727,276 | 2/1988 | Izukawa et al. | 310/316 |
| 4,794,294 | 12/1988 | Shimizu et al. | 310/316 |
| 4,914,336 | 4/1990 | Yamasaki | 310/316 |
| 5,001,404 | 3/1991 | Kataoka | 318/116 |
| 5,004,964 | 4/1991 | Kataoka et al. | 318/128 |
| 5,155,418 | 10/1992 | Kataoka | 318/116 |
| 5,198,732 | 3/1993 | Morimoto | 318/116 |
| 5,214,340 | 5/1993 | Suzuki | 310/316 |
| 5,258,694 | 11/1993 | Ohnishi et al. | 310/316 |

FOREIGN PATENT DOCUMENTS

| | | | |
|---|---|---|---|
| 59-156168 | 9/1984 | Japan | H02N 11/00 |
| 63-1379 | 1/1988 | Japan | H02N 2/00 |
| 63-18974 | 1/1988 | Japan | H02N 2/00 |
| 63-167680 | 7/1988 | Japan | H02N 2/00 |

*Primary Examiner*—Thomas M. Dougherty
*Attorney, Agent, or Firm*—Fitzpatrick, Cella, Harper & Scinto

[57] ABSTRACT

This invention relates to a vibration type actuator device, which obtains a driving force by applying alternating signals to an electro-mechanical energy conversion element.

In particular, this invention relates to an actuator device system, which forms position information of a movable member by counting pulses from an encoder using a counter upon execution of moving amount control of the movable member using the actuator device, and performs driving control of the actuator device on the basis of this count value.

In this system, a memory for storing the count value of the counter obtained when the actuator device is stopped is provided, and when the actuator device is restarted, the count value stored in the memory is transferred to the counter. When the actuator device is stopped, even if power supply to a control circuit portion such as the counter is stopped as well, precise control based on the count value of the counter can be performed upon restarting of the actuator device.

15 Claims, 5 Drawing Sheets

5,631,516

VIBRATION TYPE ACTUATOR DEVICE

This application is a continuation of application Ser. No. 08/068,075 filed May 28, 1993 now abandoned.

BACKGROUND OF THE INVENTION

1. Field of the Invention

The present invention relates to a control apparatus for a vibration actuator.

2. Description of the Related Art

A conventional control apparatus for controlling a vibration actuator is arranged to set a driving signal to be applied to a vibrating member (i.e., a stator) of the actuator to be zero when a movable member (i.e., a rotor) of the actuator is stopped, as disclosed in, e.g., Japanese Laid-Open Patent Application No. 63-18974.

In the above-mentioned prior art, the actuator does not consume any electric power while the actuator is stopped. However, in the control apparatus of the actuator, since a driving circuit connected to the vibrating member, a sensor for detecting the instantaneous position of the movable member, a position detection circuit, and the like are energized, the following problems are posed. That is, (i) electric power consumption is increased in a use with a long stop time of the movable member, and electric power utilization efficiency is lowered, and (ii) since the control apparatus generates a large amount of heat, such heat is not preferable for an electronic circuit.

In order to solve these problems, when the actuator is stopped, energization to the control apparatus may also be stopped. However, when the conventional control apparatus adopts such an arrangement, the following problems are posed. That is, (i) since position information obtained when the movable member was stopped is lost, control precision is lowered after the control apparatus is restarted, and (ii) the movable member undesirably moves when a power supply is turned on/off.

Furthermore, since a conventional actuator device starts its driving operation immediately after a power supply is turned on, the actuator device may be undesirably driven in an unstable state of a power supply circuit.

SUMMARY OF THE INVENTION

One aspect of the present invention is to provide an actuator device, which transfers position information of a movable member to a memory when the movable member is stopped, whereby even when energization to a control apparatus is stopped while the actuator device is stopped, precise control can be performed on the basis of data read out from the memory when the actuator device is restarted.

Another aspect of the present invention is to provide an actuator device, that relatively transfers, to a memory, a count value of a counter (constituting a portion of a control apparatus) for forming position information of a movable member upon turning on/off of the actuator device, and can prevent the previous position information from being lost even when energization to the control apparatus is stopped, whereby energization to the control apparatus can also be stopped when the actuator device is stopped.

Yet another aspect of the present invention is to provide an actuator device that can be operated in a stable state of a power supply circuit since the driving operation of the actuator device is started in response to a driving signal from a driving signal forming circuit for forming the driving signal for driving the actuator device, which signal is generated after an elapse of a predetermined period of time from when power supply to the driving signal forming circuit is turned on.

Other objects of the present invention will become apparent from the following description of the embodiment taken in conjunction with the accompanying drawings.

DESCRIPTION OF THE PREFERRED EMBODIMENTS

The preferred embodiments of the present invention will be described hereinafter with reference to the accompanying drawings. In the embodiments to be described below, the present invention is applied to a vibration actuator as a so-called rotary type ultrasonic wave motor consisting of a ring-shaped vibrating member and a ring-shaped movable member. However, the vibration actuator to which the present invention is applied is not limited to this, but may be of a reciprocal type or of a vibration type.

Figure 1:
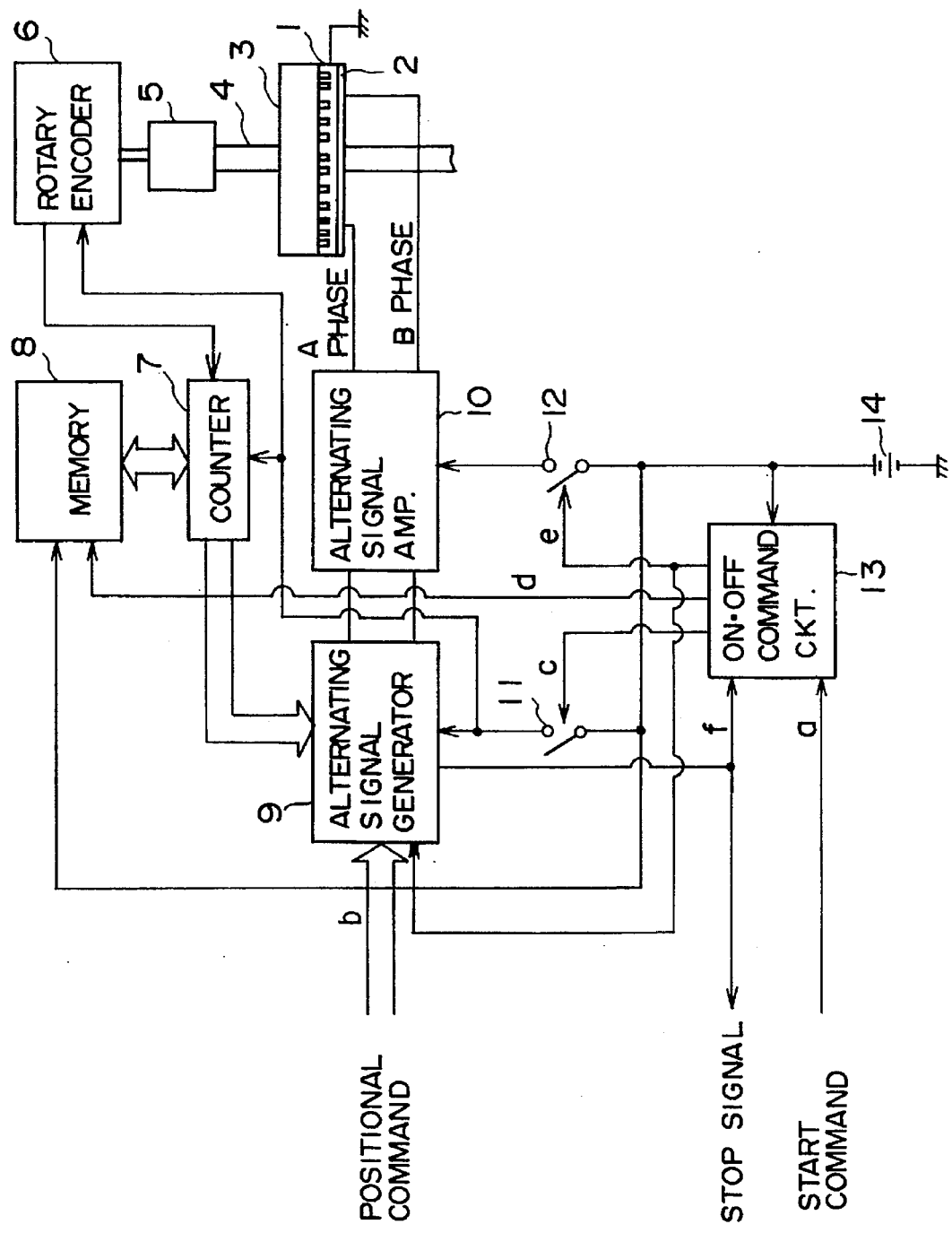
FIG. 1 is a schematic diagram showing an actuator device according to an embodiment of the present invention.

FIG. 1 is a schematic diagram showing a control apparatus according to the first embodiment of the present invention. In FIG. 1, a vibration actuator is constituted by a ring-shaped vibrating member 1 fixed to a support member (not shown), a piezo-electric element 2 (i.e., an electromechanical energy conversion element) fixed to the vibrating member 1 so as to generate a travelling wave on the surface of the vibrating member 1, and a rotor (i.e., a movable member) 3 which moves along the circumferential direction of the vibrating member 1 in a state wherein it is urged against the surface of the vibrating member 1.

An output shaft 4 is fixed to the rotor. A coupling 5 is fixed to one end of the output shaft 4. A rotary encoder 6 is attached to one end of the coupling 5, and outputs a pulse every time the output shaft is rotated by a predetermined amount.

Note that a load such as a robot arm (not shown) is connected to the other end of the output shaft 4. A calculation circuit including a position counter 7 counts output pulses from the rotary encoder 6. A memory 8 stores position information. An alternating signal generator 9 changes the frequencies, amplitudes, phases, and the like of two output alternating signals in accordance with a positional command from a command device (not shown), so that the count value of the position counter 7 indicates a position corresponding to the positional command. When the movable member 3 reaches the command position, the generator 9 sets the output signals to be zero. An alternating signal amplifier 10 amplifies and outputs the two output alternating signals from the alternating signal generator 9.

Switch elements 11 and 12 such as FETs or relays are connected to an ON.OFF command circuit 13. The ON.OFF command circuit 13 generates commands for operations of the switch elements 11 and 12 and the memory element 8 in accordance with the state of a start command from the command device (not shown) or a stop signal supplied from the alternating signal generator and indicating that the actuator is stopped. A power supply 14 is also connected to the ON.OFF command circuit 13. The control apparatus of this embodiment is constituted by the rotary encoder 6, the position counter 7, the memory 8, the alternating signal generator 9, the alternating signal amplifier 10, the switch elements 11 and 12, and the ON.OFF command circuit 13. The characteristic feature of the control apparatus of this embodiment is that the memory 8, the switch elements 11 and 12, and the ON.OFF command circuit 13 are arranged.

The ON.OFF command circuit 13 serves as a control signal generation means used when the actuator is started and stopped.

Note that in FIG. 1, a indicates a start command input from the command device (not shown) to the circuit 13; b, a positional command input from the command device (not shown) to the alternating signal (driving vibration) generator 9; c, a signal supplied from the circuit 13 to the switch element 11; d, a signal supplied from the circuit 13 to the memory 8; e, a signal supplied from the circuit 13 to the switch element 12; and f, an actuator stop detection signal generated from the alternating signal generator 9.

Figure 2:
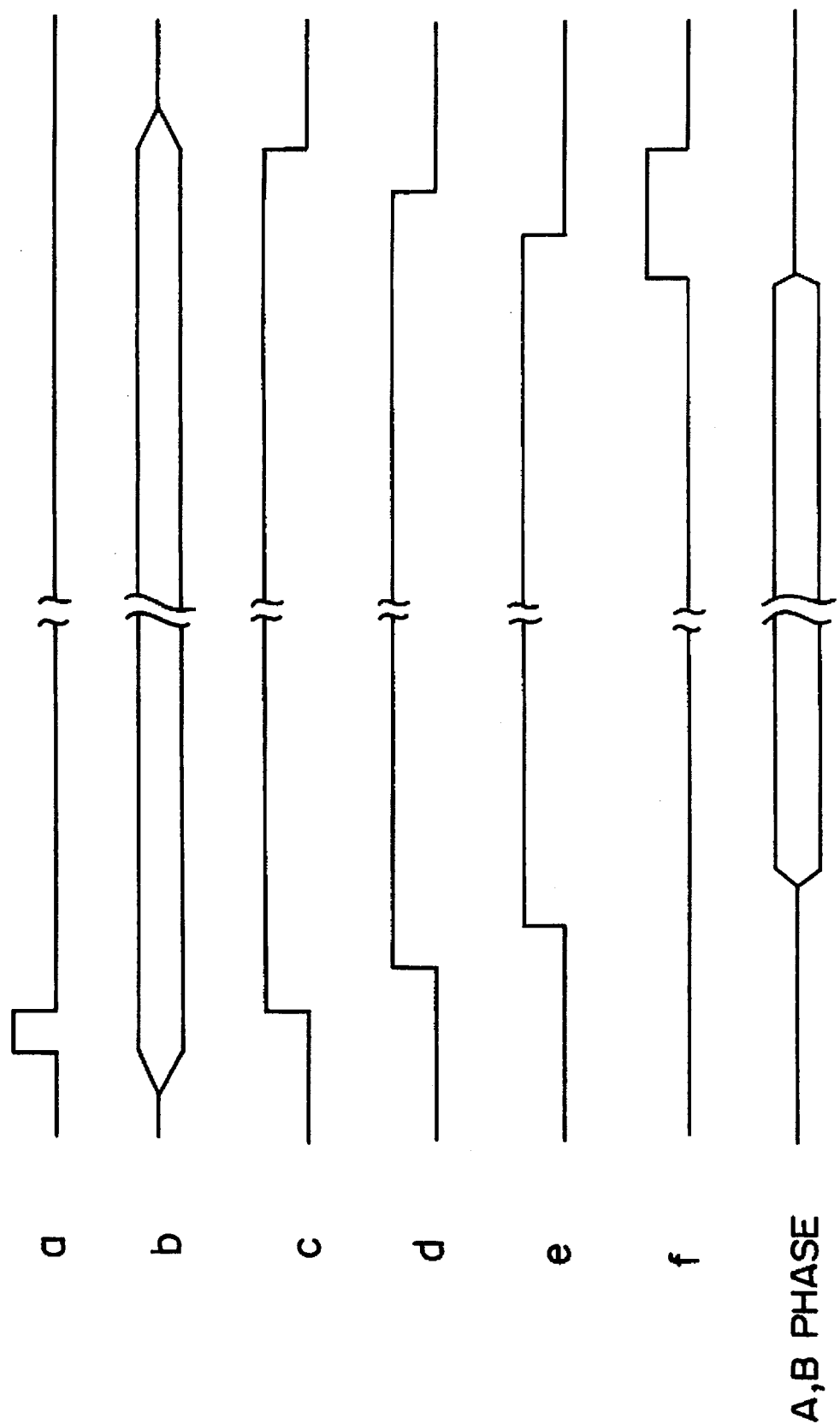
FIG. 2 is a waveform chart for explaining the operation of the circuit shown in FIG. 1.
Figure 3:
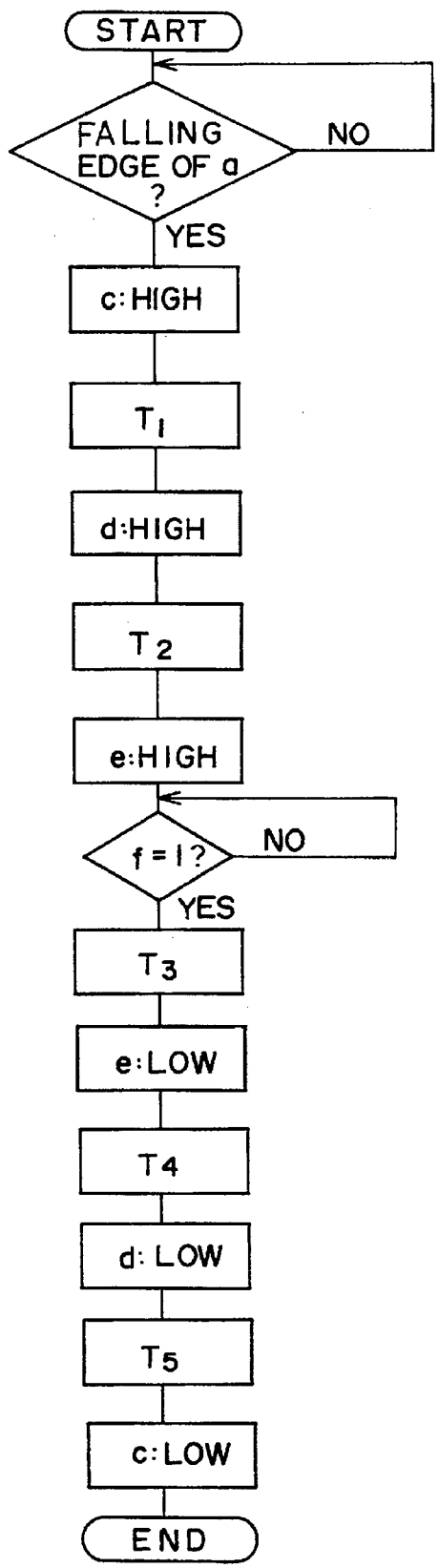
FIG. 3 is a flow chart showing an operation flow of an ON.OFF command circuit shown in FIG. 1.

FIG. 2 is a timing chart of the above-mentioned signals a to f, and A and B phases of actuator driving signals. FIG. 3 is a flow chart showing a control flow of the ON.OFF command circuit.

The operation of the circuit shown in FIG. 1 will be described below with reference to FIGS. 1, 2 and 3.

In an initial state before the actuator is started, the memory 8 stores the current rotor position, and the rotary encoder 6, the position counter 7, the alternating signal generator 9, and the alternating signal amplifier 10 are disconnected from the power supply.

First, the start command pulse a and the positional command b are input from the command device (not shown). In synchronism with the trailing edge of the start command pulse a, the ON.OFF command circuit 13 sets the signal c at high level to turn on the switch element 11, thereby connecting the alternating signal generator 9, the position counter 7, and the rotary encoder 6 to the power supply. Then, the circuit 13 sets the signal d at high level after an elapse of a delay time $T_1$ required for stabilizing the output from the rotary encoder 6. The memory 8 transfers the stored count value of the current position to the position counter 7 in synchronism with the leading edge of the signal d. After an elapse of a time $T_2$ required for transferring data, the switch element 12 is turned on by the signal e to connect the alternating signal amplifier 10 to the power supply. On the other hand, if the output from the position counter 7 is different from the positional command, the alternating signal generator 9 sets the signal f at low level, and generates alternating signals after an elapse of a time necessary for stabilizing the power supply to the alternating signal amplifier 10 from the leading edge of the signal e. Thus, two phase signals, i.e., A and B phase signals amplified by the alternating signal amplifier 10 are applied to the vibration actuator, and the actuator starts rotation. When the count value of the position counter 7 becomes equal to the positional command, the alternating signal generator 9 stops generation of the alternating signals, and generates the stop signal f (high level) indicating that the actuator is stopped.

The ON.OFF command circuit turns off the switch element 12 by the signal e after an elapse of a time $T_3$ necessary for stopping the vibration of the vibration actuator from the leading edge of the signal f, thereby disconnecting the alternating signal amplifier 10 from the power supply. The ON-OFF command circuit waits for an elapse of a time $T_4$ required for completely disconnecting the power supply from the alternating signal amplifier 10, and then sets the signal d at low level, thereby transferring the count value (indicating the current position) of the position counter 7 to the memory 8 in synchronism with the trailing edge of the signal d. After an elapse of a time $T_5$ necessary for transferring data, the switch element 11 is turned off by the signal c, thus disconnecting the alternating signal generator 9, the position counter 7, and the rotary encoder 6 from the power supply.

In this manner, when the vibration actuator is stopped, position information is saved in the low-power consumption memory, and the power supply is disconnected from circuit components other than necessary ones. Thus, by maximally utilizing the feature of the vibration actuator which does not consume any electric power in a stop state, power consumption of the circuit is minimized. In addition, since the power supply of the circuit is connected/disconnected to/from the circuit components in a predetermined procedure and at predetermined timings upon turning on/off the power supply, the vibration actuator can be prevented from being rotated upon turning on/off the power supply. Therefore, an energy-saving driving operation can be achieved without lowering stop precision.

Figure 4:
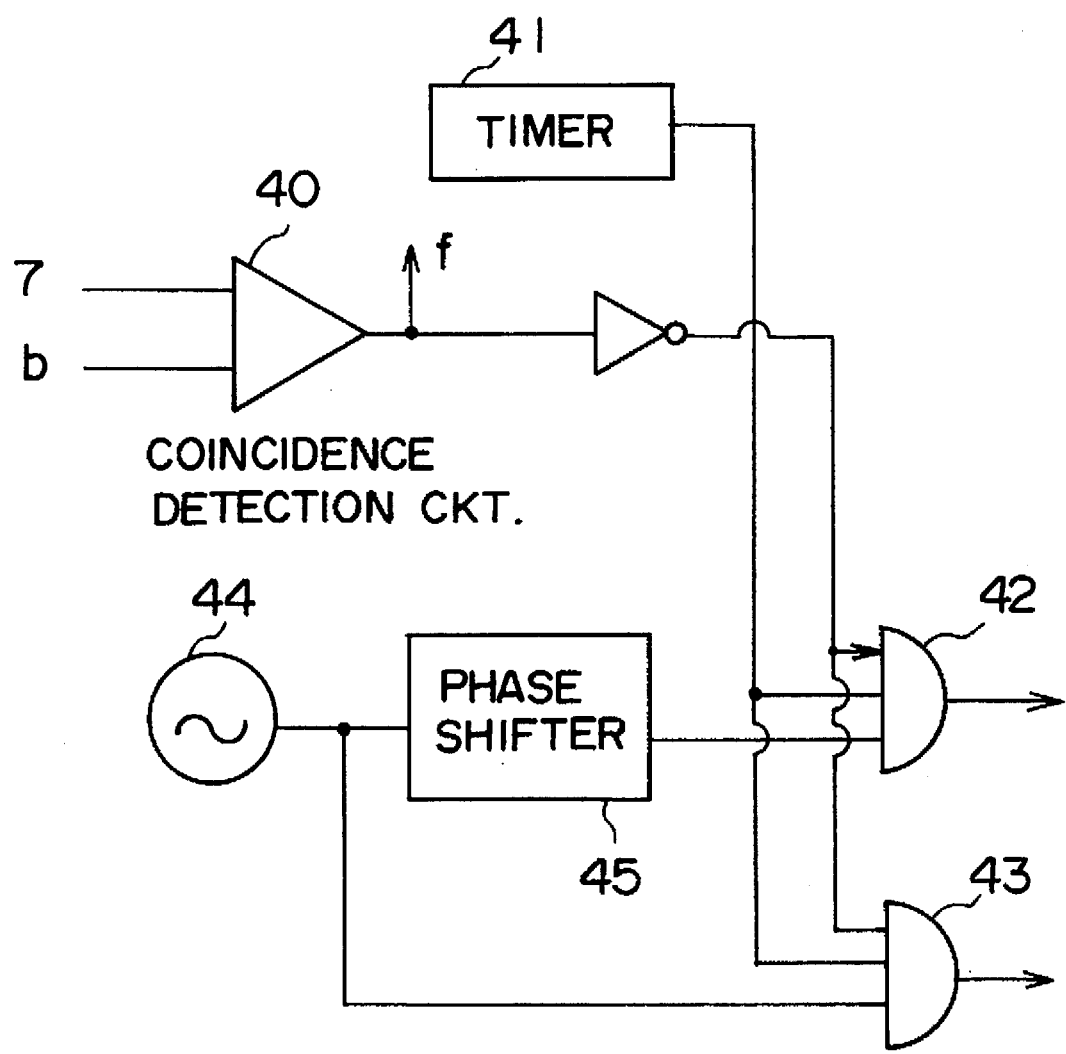
FIG. 4 is a block diagram showing an arrangement of an alternating signal generator shown in FIG. 1.

FIG. 4 is a block diagram showing an arrangement of the alternating signal generator 9. In a state wherein the power supply is connected (power supply state), a coincidence detection circuit 40 detects if the positional command coincides with the count value of the counter 7. If the positional command and the count value coincide with each other, the circuit 40 sets the signal f at high level; if they do not coincide with each other, the circuit 40 sets the signal f at low level. A timer 41 generates a high-level output after an elapse of a time required for stabilizing the power supply to the amplifier 10 after the signal e goes to high level from when the power supply is connected. In response to the output from the timer 41 and f=0, gates 42 and 43 supply an alternating signal from an alternating power supply 44, and an alternating signal obtained by phase-shifting the alternating signal from the alternating power supply 44 by a phase shifter 45 to the amplifier 10. In response to f=1, the gates 42 and 43 are disabled to stop outputting of the alternating signals.

Figure 5:
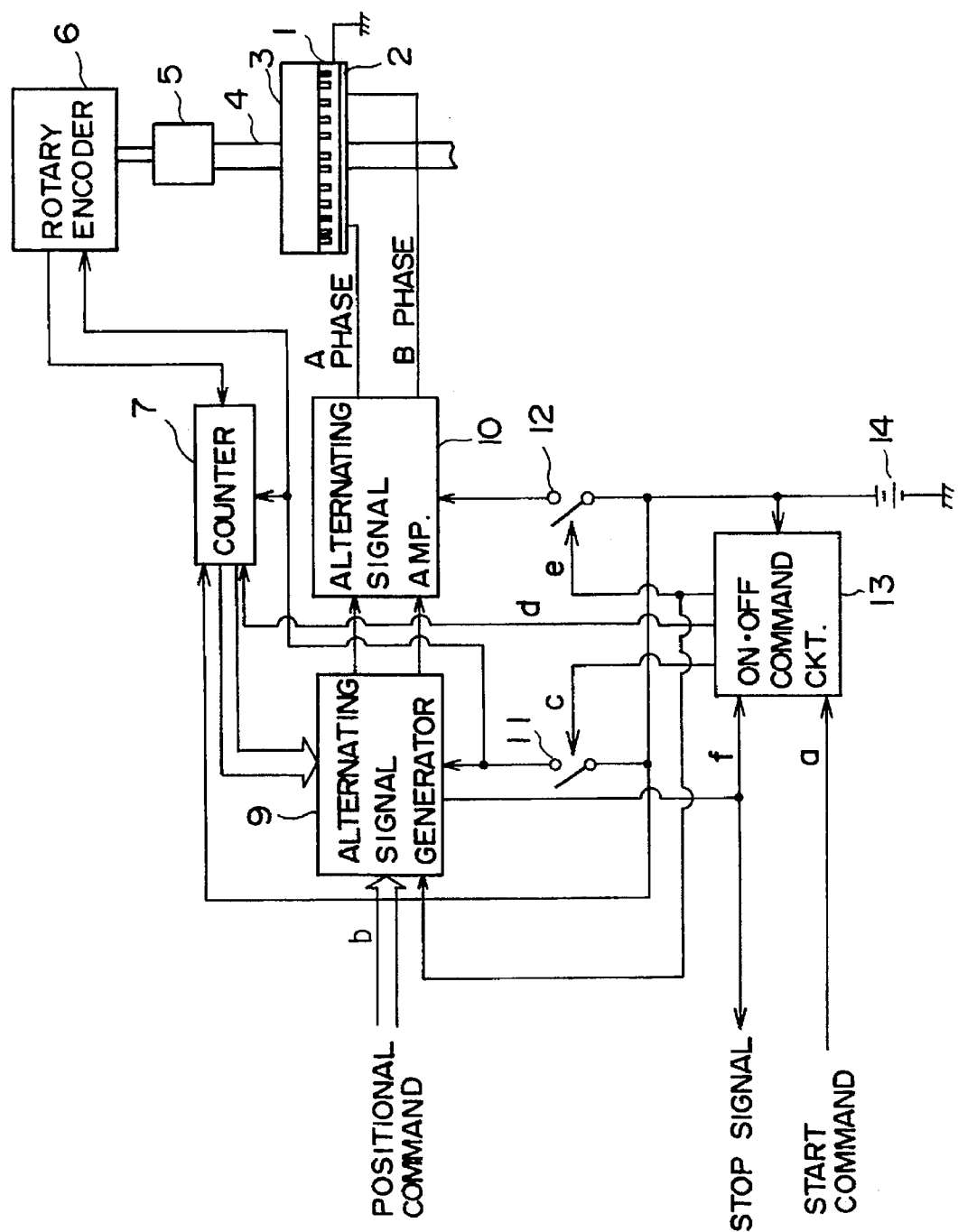
FIG. 5 is a schematic diagram showing another embodiment of the present invention.

FIG. 5 is a schematic diagram showing a control apparatus according to the second embodiment of the present invention. A difference from the first embodiment is that the counter 7 has functions of both the counter 7 and the memory 8. The timings of signals are the same as those in FIG. 2. The counter 7 is allowed to perform a count operation when the signal d goes to high level, and keeps holding its count value when the signal d goes to low level. More specifically, the counter 7 serves as a counter when the signal d is at high level, and serves as a memory when the signal d is at low level. Therefore, the same operation as in the first embodiment can be realized by a simpler circuit arrangement. An optical rotary encoder may be used since it can provide the same effect as that obtained by turning off the power supply when its light source is turned off. In the above embodiments, the rotational position or rotational amount of the rotor is detected by the encoder. Alternatively, the moving amount of a contact member which contacts the vibrating member of the actuator and moves relative to the vibrating member may be detected by the encoder.

What is claimed is:

1. A control system for an actuator device having a vibration member and a movable member, said control system obtaining a driving force by applying a driving signal to an electro-mechanical energy conversion element on said vibration member, said control system comprising:

(a) a detection circuit for detecting at least one of a moving amount or a position of said movable member relative to said vibration member caused by the driving force and for producing a detection result;

(b) a driving control circuit for outputting a driving control signal in accordance with the detection result of said detection circuit;

(c) a driving circuit, having an operative state and an inoperative state, for supplying the driving signal to the actuator device in accordance with the driving control signal output by said driving control circuit;

(d) a power supply circuit for supplying electric power to said driving circuit, said driving control circuit, and said detection circuit;

(e) a power supply control circuit for stopping the power supply to said driving control circuit and said detection circuit when said driving circuit is switched from the operative state to the inoperative state, and for permitting power supply to said driving control circuit and said detection circuit when said driving circuit is switched from the inoperative state to the operative state; and (f) a memory for storing the detection result of said detection circuit when said driving circuit is switched from the operative state to the inoperative state, and for transferring a memory value to said detection circuit when said driving circuit is switched from the inoperative state to the operative state.

2. A control system according to claim 1, wherein said power supply control circuit stops the power supply to said driving circuit when said driving circuit is switched from the operative state to the inoperative state, and wherein said power supply control circuit permits power supply to said driving circuit when said driving circuit is switched from the inoperative state to the operative state.

3. A control system according to claim 1, wherein said detection circuit comprises an encoder and a counter for receiving a signal from said encoder.

4. A control system according to claim 2, wherein said detection circuit comprises an encoder and a counter for receiving a signal from said encoder.

5. A control system according to claim 1, wherein said memory stores the detection result of said detection circuit before said power supply control circuit stops the power supply to said detection circuit, and wherein said memory transfers the memory value to said detection circuit after said power supply control circuit permits power supply to said detection circuit.

6. A control system for an actuator device having a vibration member and a movable member, said control system obtaining a driving force by applying a driving signal to an electro-mechanical energy conversion element on the vibration member, said control system comprising:

(a) an encoder for detecting a movement of the movable member relative to said vibration member caused by the driving force and for producing an output;

(b) A counter for receiving the output from said encoder and for outputting a count value, said counter comprising latch means for latching a count value;

(c) a driving control circuit for outputting a driving control signal in accordance with the output of said counter;

(d) a driving circuit, having an operative state and an inoperative state, for supplying the driving signal to said actuator device in accordance with the driving control signal output by said driving control circuit;

(e) a power supply circuit for supplying electric power to said driving circuit, said driving control circuit, and said counter; and (f) an operation control circuit for stopping the power supply to said driving control circuit and causing said counter to latch the count value thereof when said driving circuit is switched from the operative state to the inoperative state, and for permitting power supply to said driving control circuit and releasing a latched state of said counter when said driving circuit is switched from the inoperative state to the operative state.

7. A control system for an actuator device, which obtains a driving force by applying a driving signal to an electro-mechanical energy conversion element, said control system being usable with a power supply circuit for supplying electric power, and comprising:

(a) a driving signal forming circuit for receiving electric power and for forming the driving signal;

(b) an amplifier for amplifying the driving signal from said driving signal forming circuit, and for applying the amplified driving signal to the electro-mechanical energy conversion element; and (c) a control circuit for activating said amplifier after a predetermined period of time has elapsed from when electric power is supplied to said driving signal forming circuit, wherein said control circuit activates said amplifier by supplying the electric power from said power supply circuit to said amplifier.

8. A control system for an actuator device, which obtains a driving force by applying a driving signal to an electro-mechanical energy conversion element, said actuator having an operative state and an inoperative state, said control system being usable with a power supply circuit for supplying electric power, and comprising:

(a) a driving signal forming circuit for forming the driving signal;

(b) an amplifier for amplifying the driving signal from said driving signal forming circuit, and for applying the amplified driving signal to the electro-mechanical energy conversion element; and (c) a control circuit for stopping power supply from the power supply circuit to said driving signal forming circuit after a predetermined period of time has elapsed from when said amplifier is deactivated.

9. A control system according to claim 8, wherein said control circuit deactivates said amplifier by stopping the power supply from said power supply circuit to said amplifier.

10. A control system for an actuator device having a vibration member, said control system obtaining a driving force by applying a driving signal to an electro-mechanical energy conversion element on the vibration member and causing a contact member contacted with the vibration member or a movable member to relatively move by the driving force, said control system comprising:

(a) a detection circuit for detecting information corresponding to at least one of a moving amount or a position of the contact or movable member relative to the actuator device caused by the driving force, and for producing an output;

(b) a driving control circuit for controlling the actuator device in accordance with the output of said detection circuit;

(c) a power supply circuit for supplying electric power to said driving control circuit and said detection circuit;

(d) a memory circuit for storing the output of said detection circuit when the actuator device is stopped by said driving control circuit; and (e) a power supply control circuit for stopping the power supply to said detection circuit after a drive of the actuator device is stopped by said driving control circuit and after a storing operation by said memory circuit.

11. A control system for an actuator device having a vibration member, said control system obtaining a driving force by applying a driving signal to an electro-mechanical energy conversion element on the vibration member and causing a contact member contacted with the vibration member or a movable member to relatively move by the driving force, said control system comprising:

(a) a detection circuit for detecting information corresponding to at least one of a moving amount or a position of the contact or movable member relative to the actuator device caused by the driving force and for producing an output;

(b) a driving control circuit for controlling the actuator device in accordance with the output of said detection circuit;

(c) a power supply circuit for supplying electric power to said driving control circuit and said detection circuit;

(d) a power supply control circuit for starting power supply to said detection circuit when a drive of the actuator device is started by said driving control circuit; and (e) a memory circuit for transferring a content to said detection circuit at least after the power supply to said detection circuit is started, said driving control circuit operating after the content is transferred from said memory circuit to said detection circuit.

12. A control system for an actuator device having a vibration member, said control system obtaining a driving force by applying a driving signal to an electro-mechanical energy conversion element on the vibration member and causing a contact member contacted with the vibration member or a movable member to relatively move by the driving force, said control system comprising:

(a) a detection circuit for detecting information corresponding to at least one of a present moving amount or a present position of the contact or movable member relative to the actuator device caused by the driving force, and for producing an output, said detection circuit having a moving signal forming portion and an information forming portion wherein the moving signal forming portion detects the relative movement of the contact or movable member and forms a signal each time a predetermined amount of movement is detected, and the information forming portion inputs the signal from the moving signal forming portion and forms information corresponding to the present moving amount or present position;

(b) a driving control circuit for controlling the actuator device in accordance with the output of said information forming portion of said detection circuit;

(c) a memory circuit for storing the output of said information forming portion of said detection circuit; and (d) store control means for, when a driving operation of the actuator device is stopped by said driving control circuit, starting storing of the output of said information portion of the detection circuit in said memory circuit after a predetermined period of time has elapsed from when the driving operation is stopped.

13. A control system for an actuator device having a vibration member, said control system obtaining a driving force by applying a driving signal to an electro-mechanical energy conversion element on the vibration member and causing a contact member contacted with the vibration member or a movable member to relatively move by the driving force, said control system comprising:

(a) a detection circuit for detecting information corresponding to at least one of a present moving amount or a present position of the contact or movable member relative to the actuator device caused by the driving force, and for producing an output;

(b) a driving control circuit for controlling the actuator device in accordance with the output of said detection circuit;

(c) memory circuit for storing the output of said detection circuit;

(d) store control means for, when a driving operation of the actuator device is stopped by said driving control circuit, starting storing of the output of said detection circuit in said memory circuit after a predetermined period of time has elapsed from when the driving operation is stopped; and a power supply control circuit for stopping power supply to said detection circuit after storing in said memory circuit.

14. A control system for an actuator device having a vibration member, said control system obtaining a driving force by applying a driving signal to an electro-mechanical energy conversion element on the vibration member and causing a contact member contacted with the vibration member or a movable member to relatively move by the driving force, said control system comprising:

a movement detection circuit for detecting each time the contact or movable member moves a predetermined amount relative to the actuator device, and for outputting a signal each time such movement is detected;

a calculation circuit for inputting a signal from said movement detection circuit and for calculating information which corresponds to at least one of a moving amount or a position of the contact or movable member relative to the actuator device caused by the driving force;

a driving control circuit for controlling the actuator device in accordance with the output of said calculation circuit;

a memory circuit for storing the output of said calculation circuit;

transfer means for transferring a content stored in said memory means to said calculation circuit; and a control circuit for operating said driving control circuit after the transfer by said transfer means is finished.

15. A control system according to claim 14, further comprising power supply means for starting power supply to said calculation circuit, wherein said transfer means is operated after the power supply is started by said power supply means.

* * * * *